H. K. HARRIS.
ADVERTISING DEVICE AND THE LIKE.
APPLICATION FILED MAR. 17, 1911.

1,138,471.

Patented May 4, 1915.
6 SHEETS—SHEET 1.

WITNESSES:

INVENTOR
Henry K. Harris
BY
ATTORNEYS

H. K. HARRIS.
ADVERTISING DEVICE AND THE LIKE.
APPLICATION FILED MAR. 17, 1911.

1,138,471.

Patented May 4, 1915.
6 SHEETS—SHEET 5.

WITNESSES
Samuel E. Wade
Walton Harrison

INVENTOR
Henry K. Harris.
BY
Munn & Co.
ATTORNEYS

H. K. HARRIS.
ADVERTISING DEVICE AND THE LIKE.
APPLICATION FILED MAR. 17, 1911.

1,138,471.

Patented May 4, 1915.
6 SHEETS—SHEET 6.

WITNESSES
George L. Blume.
C. E. Holske

INVENTOR
Henry K. Harris
BY
ATTORNEYS

UNITED STATES PATENT OFFICE.

HENRY KINGSFORD HARRIS, OF RUNWELL, WICKFORD, ENGLAND.

ADVERTISING DEVICE AND THE LIKE.

1,138,471. Specification of Letters Patent. Patented May 4, 1915.

Application filed March 17, 1911. Serial No. 615,128.

*To all whom it may concern:*

Be it known that I, HENRY KINGSFORD HARRIS, subject of the King of England, residing at Runwell, Wickford, Essex, England, have invented certain new and useful Improvements in and Relating to Advertising Devices and the like, of which the following is a specification.

My invention relates to display devices operated mechanically and electrically, my more particular purpose being to provide means, controllable from a distance by a controlling apparatus, which I designate as a jacquard, in such manner as to display a number of legends or intelligible signs so arranged as to act as a visual signal, the jacquard being adapted for controlling within reasonable limits, the character of the signals displayed.

My invention includes among other things, besides the jacquard, which is located at the transmitting station, a receiving or displaying apparatus located at a receiving station and comprising a number of separate units, each provided with a display device, the several display devices acting collectively to produce a composite visual signal.

Other objects and advantages, not at this time specifically set forth, will appear as the description of the structure proceeds, the novel features set forth and embodying the principles of the invention being included within the appended claim.

Reference is to be had to the accompanying drawings, forming part of this specification, in which similar characters of reference denote corresponding parts in all the views, and in which—

Figure 1 is a side elevation of one of the units; Fig. 3 is a detail of the forward driving spindle; Fig. 4 sets forth the detail of the reversing spindle; Figs. 5 and 6 show details hereinafter more specifically referred to; Fig. 10$^a$ is a side elevation constituting a continuation of the mechanism shown in Fig. 10; Fig. 11$^a$ is an end elevation, being a continuation of the mechanism shown in Fig. 11.

The structure of a single unit may be understood by reference to Figs. 1 to 5 inclusive. I provide two side members $a$, held together in any suitable manner, as by means of rods, or, in fact, any kind of braces $a'$; between the sides of the frame and revolubly mounted in position is a winding roller $b$, a take-up roller $c$, and guide rollers $d$, $e$, the band $f$ carried by the winding roller $b$ passing around the guides $d$ and $e$ and being also carried on the take-up roller $c$. This band may be made of any suitable and desirable material, transparent or otherwise, and may be provided with suitable characters or numerals or words printed thereon or mounted and displayed in any appropriate manner.

Extending transversely of the unit, and mounted in suitable bearings carried thereby, are the shafts $s$, $t$; the shaft $t$ is the forward driving shaft and the shaft $s$ is the reverse driving shaft, it being noted from Fig. 4 that the shaft $t$ is provided with a clutch element $r$ and the shaft $s$ is provided with a similar clutch element $q$; coöperating with the element $r$ is the other clutch element $p$ which controls the forward driving clutch, while the element $n$, which coöperates with the clutch element $q$, controls the reverse driving shaft $s$. Still considering Fig. 4, it will be noted that between the clutch members $n$ and $p$ is a double-forked lever $u$, secured rigidly upon a link $w$, the link being pivotally engaged at one end of the rod $x$. As shown in this figure, both clutches are in inoperative position, being disengaged, such position, however, being one that does not occur in practice, the structure herein set forth being shown merely for purposes of clearness. It will be borne in mind, however, in setting forth the further description and operation of the device that in practice one or other of the clutches is in operative position. The forked lever u at its opposite ends 2, 3, is provided with projecting studs which engage in the annular grooves in the clutch members n, p, so that, if the rod is actuated, one or other of the clutches will be brought to operative position.

The clutch members n, p, are carried by comparatively short shafts s', t', provided at their outer ends with pinions k and m, which mesh with a gear h turning with the shaft g, driven by the main driving motor 36; the inner ends of the shafts s', t', may be mounted in any desirable manner, preferably by being inserted into the bores in the ends of the shafts s, t, so that rotation of the shaft g causes the turning of either of the shafts s or t through the medium of one of the clutches set forth.

A gear wheel 4 is carried on the shaft t adjacent one side of the frame, and meshes with another gear wheel 5, this gear wheel 5 (Fig. 3) and the clutch member 6 being loosely mounted upon the shaft 7, which carries the before-mentioned take-up roller c. Coöperating with the clutch member 6 is another clutch member 8 which is provided with an annular groove (Fig. 3) 8ª, in which two studs 48ª carried by the ends of a fork 48 engage. Movement of the fork brings the parts of the clutch into or out of engagement, the movable part 8 engaging with a key-way 7ª (Fig. 3) on the shaft 7.

Figures 1, 2, 3, 5, 6:
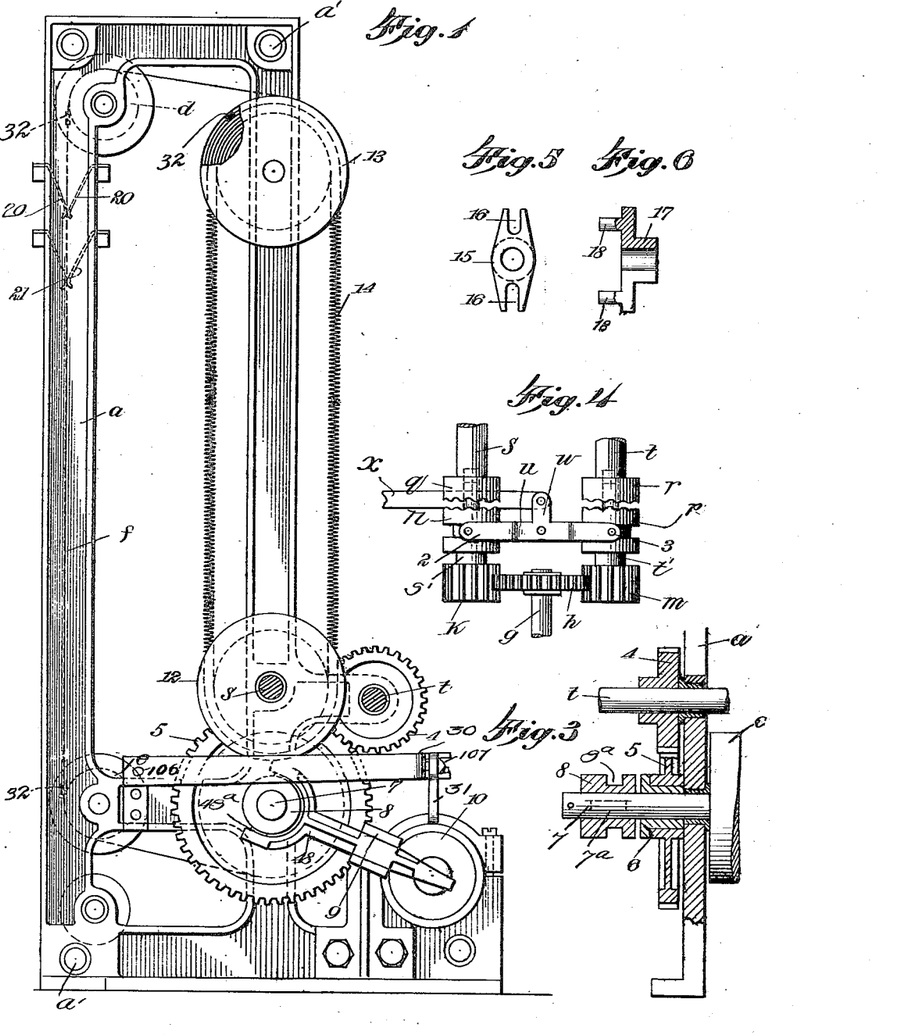
Figure 2:
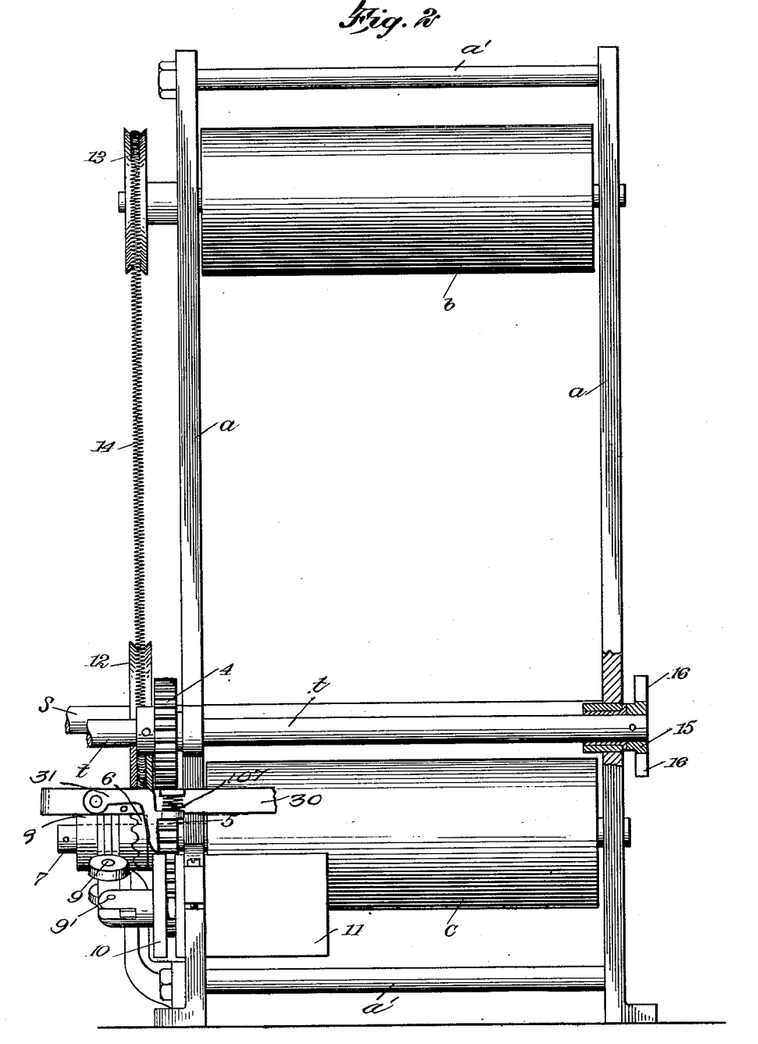
Fig. 2 is a rear view thereof.

The fork 48 is pivotally mounted at 9 in a suitable bearing carried by the frame, the opposite end of the fork being pivotally mounted at 9' to a portion of the armature 10 of the electromagnet 11 (Fig. 2). If, now, a circuit is completed through the electromagnet, the armature 10 is attracted, so as to move the clutch member 8 out of engagement with the clutch member 6, thus stopping rotation of the gear wheel 5 and the roller c. In order to maintain the clutch members out of engagement with each other, any suitable spring-actuated device may be used, for instance, the spring-actuated locking bar 30 shown in Fig. 7. This bar is preferably provided with a nose 31 by which the armature 10 is engaged and held in position. A spring 11ª tends to hold the armature 10 away from the electromagnets. One such locking bar is provided for all of the electromagnets.

Each of the several units of my system is made up of the elements so far described in detail.

On the shaft s (Fig. 2) is a pulley 12, and another pulley 13 is carried by the shaft which supports the roller b. An endless band 14, having in this instance the form of a stretched helical spring, passes around these pulleys 12 and 13. The shafts s and t are alike for each of the units. In order that any number of units may be employed and that each unit may be self-contained, I make these shafts in sections disposed end to end so that they may be coupled together or even used as two long shafts. Referring particularly to Fig. 2, it will be noted that one end of the shaft t is provided with a coupling plate 15 having two slots 16 therein (Fig. 5), the opposite end of the corresponding shaft t of the next successive unit being provided with a plate 17 having two pins 18 extending therefrom. The pins 18 are adapted to engage in the slots 16, so that rotation of the shaft t of one unit is imparted to the similar shaft of the next unit throughout any number of units. Fig. 4 shows the ends of the shafts s and t, nearest the driving mechanism, it being understood that the clutch members r and p control the forward drive of all the units since all the shafts t are connected together. The parts n, q, control the reverse movement of the bands carrying the characters for all the units, since the shafts s of these units are connected together and turn as a single shaft. While the shafts s and t may thus rotate throughout the units, the position of the band f, in each unit, is controlled by the electromagnet 11 and the parts actuated thereby on the same unit. The electromagnets 11 are energized by the jacquard card or a similar device to be presently set forth.

Figure 7:
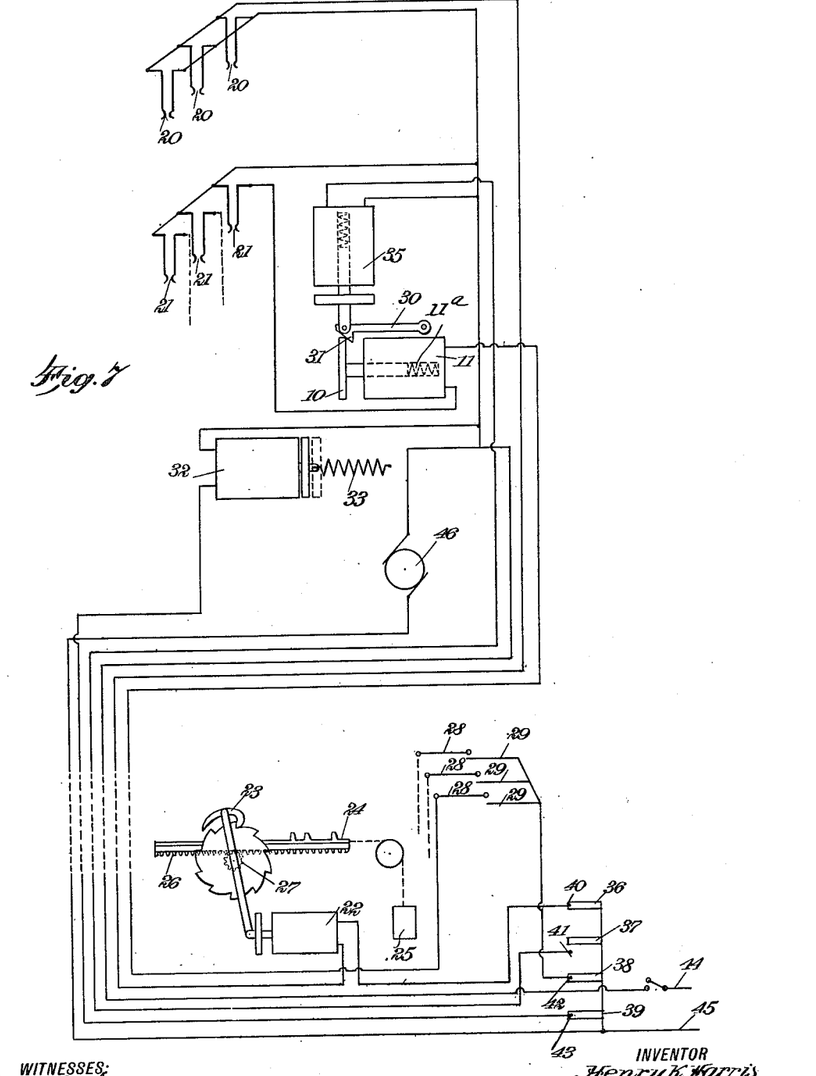
Fig. 7 is a diagrammatic view showing the electrical connections between the different elements of the outfit.

Carried by the frame, as shown in Fig. 7, are a number of pairs of contact fingers 20, 21, grouped into two series. Each band f, carrying a legend to be displayed, passes between a pair of contact fingers 20 and also between a pair 21. At various points along the band f, and preferably adjacent the sides thereof, are metallic contact pieces 19, adapted to come into engagement with the spring fingers 20 and 21, as the band is actuated. The two series of contact fingers 20 and 21, serve two purposes, one being to cause a step by step movement to the jacquard card in the operation of the mechanism, the other being to insure the correct positioning of the legend in each particular unit before it is secured in its fixed display position. All of the pairs of contact fingers 20 are connected in parallel and (Fig. 7) one side of the parallel circuit is placed in series with the electromagnet 22 of the jacquard device, the two sides of the circuit from these contacts being then connected in a manner to be described. The electromagnet 22 actuates an escapement 23, whereby the jacquard card 24 moves under the influence of the weight 25, the jacquard and the shaft on which the escapement is mounted being provided with coöperating parts 26, 27, which form a rack and pinion.

It is not my intention to set forth any particular jacquard device as an essential feature of the display mechanism herein described and claimed, as the jacquard may assume different forms. The manner in which the jacquard mechanism may actuate the display device is indicated in Fig. 7. Each band *f* carries legends arranged in a definite order of succession—say the letters of the alphabet in conventional order. To display the word CAB, for instance, three units are used, but the letters do not move into position at the same instant. That is to say, if there be three units disposed abreast, the middle unit first displays the letter A, the third unit (the one to the right of the observer) next displays the letter B, and then the first unit (to the observer's left) displays the letter C. To aid in accomplishing this purpose, the letters are arranged alphabetically upon the different bands *f*. The magnets 11 of the three units being energized, in the proper successive order to accomplish this result, the several bands *f*, after being moved successively into their respective positions, are prevented from moving farther by the locking mechanism, although the actuating motor for all of the units may be operated continuously. As the driving motor continues in action, no further motion of the band having the characters thereon takes place. After a certain length of time, however, the magnet 11 is deënergized by the practically automatic action of the jacquard. The jacquard may be caused to move when no bands are working or being moved, and, consequently, when no metallic contacts are passing between the spring fingers 20 by means of any suitable contact-making device in connection with the motor, or by means of an additional band used solely for this purpose in order to bring into position the pin or similar device which breaks the circuit through the magnet of the reversing clutch. Such constant running of the jacquard is not essential, however, as it may come to rest after all of the units have come into position to set forth the desired character or numeral.

As may be understood from Fig. 7, the electromagnet 32 is operatively connected with the rod *x* shown more particularly in Fig. 4, for the purpose of actuating the clutch members *n*, *p*, shown in this figure. The contact members 28, 29, are used for the purpose of enabling the jacquard to electrically control the clutches 68. A main line switch is shown at 44 and is placed in one side of the line, the other side being designated as 45. This line leads to the brushes of the motor 46 for controlling the units whenever the switch 44 is closed. When this main line switch 44 is closed and a metallic contact on any one of the strips *f* passes between the spring arms 20, the circuit through the electromagnet 22 is closed and the escapement 23 is actuated, causing one tooth to move, the jacquard card being thereby moved. The spring contacts 21, also adapted to be placed in electrical contact with each other by means of the metallic contacts 19 carried on a strip, are all connected together on one side with one side of the main line. One of the pairs of contacts is in circuit with the electromagnet 11 on one of the units, while the other pairs of contacts 21 would be placed in circuit with the electromagnets on the other units, it being understood that there are as many pairs of contacting fingers as there are units.

The electromagnet 11 is shown in operative position in Fig. 2. This electromagnet 11 is also connected to one of the pairs of conductors 28, 29, of the jacquard. The conductor 28, connected to this particular electromagnet 11, may be brought into contact with the conductor 29 by any suitable means. All the conductors 29 on the jacquard card are connected together and led down to the terminal 42 connected with one side of the main line 45 through a connector 38. The arrangement of terminals 40, 41, 42 and 43, and coöperating contacting elements 36, 37, 38, 39, forms a multiple switch operating in substantially the following manner: The coöperating connectors 36, 37, 38 and 39 are connected together and to one side 45 of the main line. In one position of the switch, that is, driving position, the motor is connected to the source of supply, the contacting fingers 20, 21, and the electromagnet 11 being also placed in circuit. The electromagnet 32 is also energized, this magnet being the only one employed no matter how many units are in use, since it merely controls the rod *x* (Fig. 4) which in turn takes care of the forward and reverse movements of the clutches. The switch shown in Fig. 12, made up of the connectors and terminals mentioned, in another position places the electromagnet 35 in circuit when the connector 37 engages the terminal 41. This done, the electromagnet lifts the nose 31 of the locking device 30, whereby the armature 10 is released because of the expansion of the helical spring 11ª within the electromagnet. There are as many electromagnets 11 as there are units. In moving from the first position to the second position, the connectors 36, 38 and 39, leave the terminals 40, 42, and 43, with the consequent opening of the circuit leading from these terminals. Suppose, however, that the band *f* is being driven forward. The parts 6 and 8 of the clutch (Fig. 2) being in engagement, if a pin on the jacquard card causes the contacts 28 and 29 to engage for that particular unit, a complete circuit will be established through the electromagnet 11 of that unit, the circuit, however, being open between the spring arms 21. Now, when a contact 19 on the band *f* comes between these spring arms 21, that is, when the band has been brought into the correct position of display, the circuit is entirely completed with the magnet 11. Thus it will be seen that after the jacquard card has been moved forward until a contact has been made for a certain unit, the letter or other element on the corresponding band $f$ is brought into position, and consequently the drive on this band is stopped. Hence, when all the letters or characters of any particular announcement have been brought into position, the advertisement will be displayed for a certain length of time. It is to be noted, however, that the electromagnet 32 (which controls the rod $x$) has, during all this time been energized through the connector 39 and the terminal 43; when this contact is broken, as elsewhere described, the spring 33, connected to the armature of the electromagnet 32, holds the armature out and consequently moves the rod $x$. Therefore, the double fork $u$ (Fig. 4) throws out of gear the clutch members $r$, $p$, and puts into gear the clutch members $q$, $n$. In such position of these parts, the motor 46 operates the shaft $s$, and all the bands backwardly until they reach their respective normal or zero positions. Since some of these bands have been turned forward a greater length than others before the reversing action took place, those which have been turned forward a short distance reach their zero positions before those which have been moved through a long distance, and, in order to take care of this, the spring belts 14 slip idly upon the pulleys 13 carried by those units the bands of which have already been brought to zero position. The connector 37 of the jacquard switch has now, however, come into contact with the terminal 41; the circuit passes around the electromagnet 35 and thence to the side 44 of the line. The armature of this electromagnet is lifted and the nose 31 releases the armature of the electromagnet 11, which springs out under the action of the spring 11ª, and the parts 6, 8, of the clutch (Fig. 2) come into engagement. The result is that when the jacquard switch comes back to its first position, with the connector 37 out of engagement with the terminal 41, the parts $n$, $q$, of the clutch (Fig. 4) are thrown out and the parts $r$, $p$, (Fig. 4) are thrown in, the roller $c$ being again ready to wind on itself the band $f$ through the gearing 4, 5, and the clutch parts 6, 8. A large variety of arrangement of letters or characters on the various bands $f$ may be taken care of solely by the differing arrangement of the contacts on the jacquard, which contacts may, if so desired, be set by hand.

The method of carrying out the invention hereinbefore described is not particularly adapted for operating the display devices at great distances from the operating jacquard since the cost of providing the multiple cable would render it prohibitive. I have, however, arranged modified circuits adapted to take care of the devices at some distances, which arrangements will now be set forth.

Figure 8:
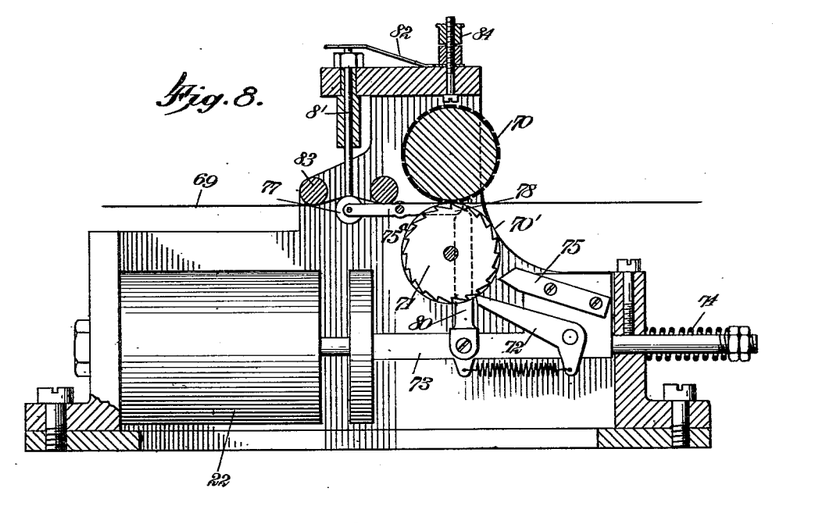
Fig. 8 is a side view setting forth some of the detail of one form of jacquard.
Figure 9:
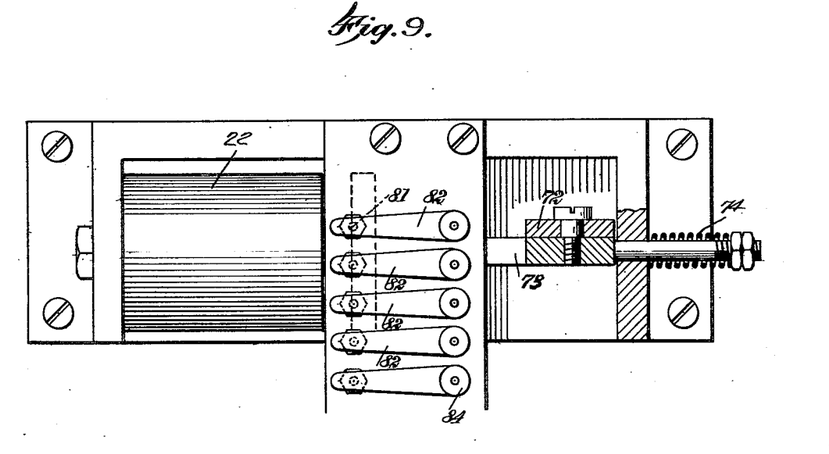
Fig. 9 is a partial top plan view thereof.

Referring particularly to Figs. 8 and 9, another form of jacquard feed and escapement is set forth, especially adapted for use at the transmitting station. In this case a perforated jacquard 69 is used in the form of a band which passes between the rollers 70, 70', covered with suitable material, such as rubber and the like, to insure a non-slipping feed. The spindle of the roller 70' is provided with a ratchet wheel 71. A spring-controlled pawl 72 is attached to a rod 73 which is carried by a suitable bearing, and which is controlled by the spring 74. The nose of the pawl 72 in its outer position is so located that it is not in immediate engagement with the teeth of the ratchet wheel but is spaced therefrom by a distance equal to about three-fourths of a single tooth. At 75 is a fixed pawl which, in the forward position of the pawl 72, engages a tooth of the ratchet 71 and prevents it overrunning. The electromagnet of the jacquard drive is designated 22. A pivotally mounted frame 75ª carries at one end a metal roller or rollers 77, the other end 78 being slightly beveled. A projecting rod 80 is fixed to the rod 73 and is so arranged that it comes against the end of the beveled portion of the tail 78 when the pawl 72 is in its outermost position. A sliding pin 81 is secured to a leaf spring 82, so that normally the spring keeps the sliding pin raised. Guide rollers 83 are provided for the jacquard band. Terminals 84 are connected with the springs 82, as shown in Fig. 11.

The operation of this form of mechanism is as follows: When the electromagnet 22 is energized, its armature is attracted and draws along with it the rod 73, which causes the projecting arm 80 to assume a position under the end of the tail 78. The consequent upward movement of the tail 78 causes the roller 77 to move downwardly and, as the armature is still further attracted, the nose of the pawl 72 contacts with a tooth on the rachet wheel which turns the roller 71 and the roller 70. These rollers cause the jacquard band to be drawn between them. Since, however, the roller 77 is not pressing the band into contact with the pin 81, the band is quite free to move and is not liable to be damaged as it would be were the rollers 77 not lowered. When the current through the electromagnet 22 stops, the spring 74 permits the rod 73 to move outwardly. As the projection 80 is withdrawn, the roller 77 springs up under the action of the spring 82. A fresh portion of the jacquard band now comes opposite one of the pins 81, and the circuit is completed through this pin and the metal roller 77.

Figures 11, 12, 13:
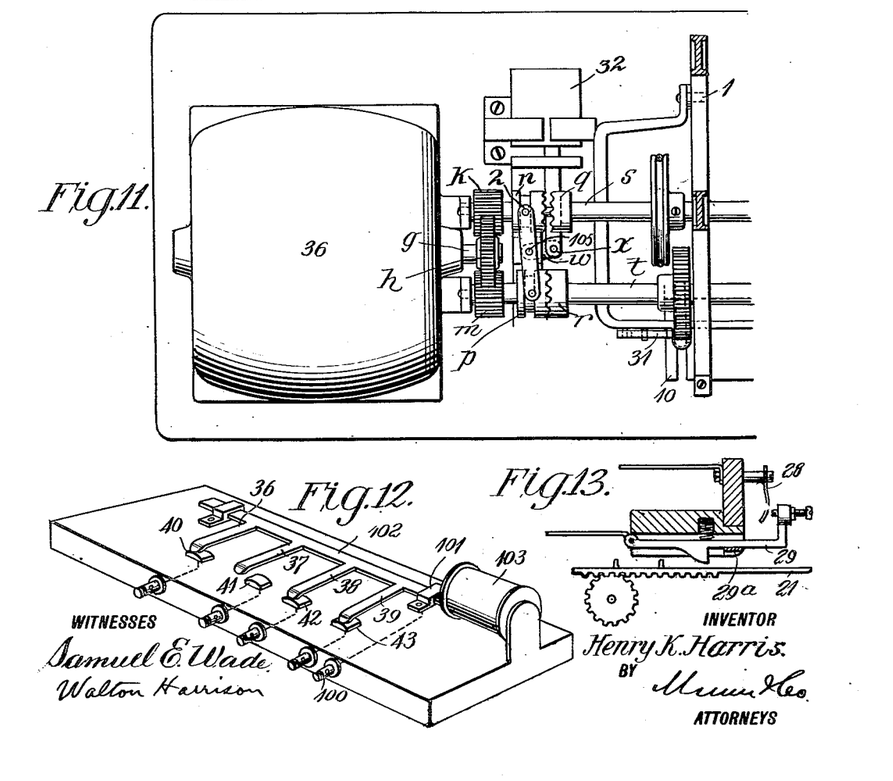
Fig. 11 is an end elevation of the actuating motor and parts immediately associated therewith.
Fig. 12 is a detail showing in perspective the means employed at the receiving station for maintaining the display members of the several units in fixed position after such members have been moved into such position, in order that the signal displayed may be readily observed.
Fig. 13 is a detail showing in section, the relation between certain contact members and the jacquard mechanism.
Figure 11A:
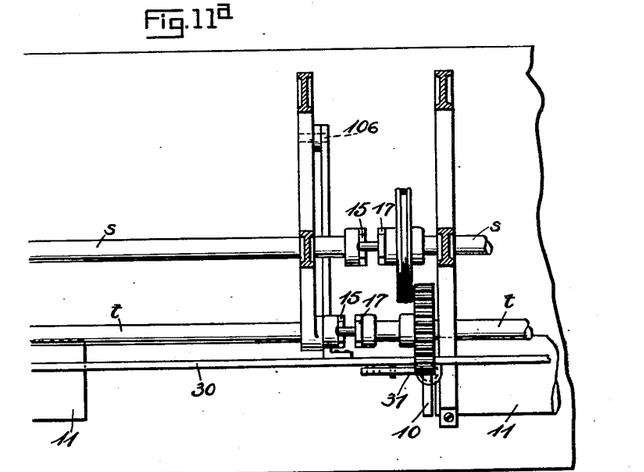

The mechanism shown in Fig. 12 is somewhat in the nature of a magnetically operated contact switch. A number of binding posts are shown at 100 and are in electrical communication with the various staionary contact members 40, 41, 42 and 43 and with a metallic guide 101. Extending through this guide is a metallic bar 102 with which the contact fingers 36, 37, 38 and 39 are integral. An electromagnet is shown at 103 and is used to slide the bar 102 in the general direction of its length. The contact fingers 36, 37, 38 and 39 engage and disengage the contact members 40, 41, 42 and 43 according to the position occupied from time to time by the bar 102.

Figure 10:
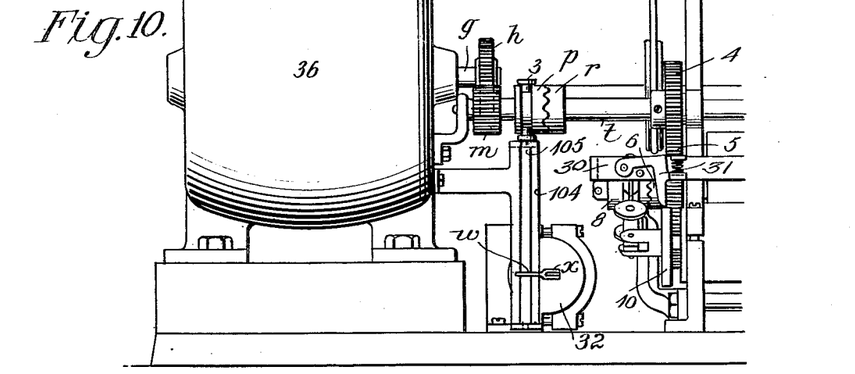
Fig. 10 is a side elevation of a portion of the mechanism located at the receiving station, the parts shown including the actuating motor for operating the various units.
Figure 10A:
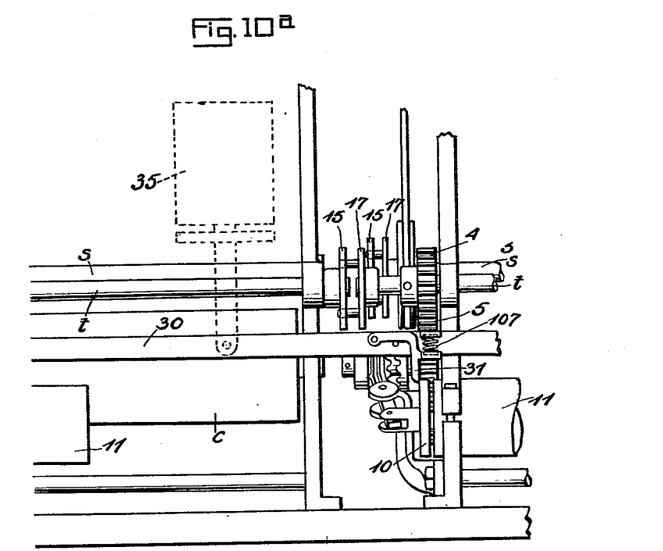

In the mechanism shown in Fig. 13 the conductor 29 rests upon a support 29ᵃ which acts as a limiting stop and prevents it from becoming misplaced. In order to assist in supporting the clutch mechanism shown in Fig. 10 I employ a bearing post 104 and extending through this bearing post is a rocking stem 105 carrying the rocking lever 2. For convenience in securing the parts of the frame-work together, as shown in Fig. 1, I employ bolts 106. A spring 107 presses upon the movable member 31 to normally hold the same in the position indicated in Figs. 1 and 2. The details of construction of the different magazines, as to size and shape and the material of which the different parts are made, may be varied without departing from the inventive idea disclosed.

I claim—

In an advertising device, the combination of a plurality of movable bands each provided with intelligible legends, feed rollers moving said bands, a contact member carried by one of the bands, a stationary contact member mounted partially within the path of travel of said first-named contact member, clutch mechanism throwing said feed rollers into and out of action, a magnet for controlling said clutch mechanism, an electric circuit connected with said magnet for energizing the same, said circuit being controlled by said contact members, and jacquard mechanism for further controlling said electric circuit.

In testimony whereof I affix my signature in presence of two witnesses.

HENRY KINGSFORD HARRIS.

Witnesses:
A BROWNE,
H. D. JAMISON.